April 25, 1967  J. L. MOE  3,316,462
VOLTAGE COMPENSATION CIRCUIT
Filed July 20, 1964  3 Sheets-Sheet 1

INVENTOR.
JOHN L. MOE
BY
ATTORNEY

April 25, 1967  J. L. MOE  3,316,462
VOLTAGE COMPENSATION CIRCUIT
Filed July 20, 1964  3 Sheets-Sheet 2

INVENTOR.
JOHN L. MOE
BY
ATTORNEY

April 25, 1967 J. L. MOE 3,316,462
VOLTAGE COMPENSATION CIRCUIT
Filed July 20, 1964 3 Sheets-Sheet 3

INVENTOR.
JOHN L. MOE
BY
ATTORNEY

United States Patent Office 3,316,462
Patented Apr. 25, 1967

3,316,462
VOLTAGE COMPENSATION CIRCUIT
John L. Moe, Winona, Minn., assignor to
Waynco, Inc.
Filed July 20, 1964, Ser. No. 388,341
8 Claims. (Cl. 317—123)

The present invention relates to a control circuit having an amplifier operable with a switching device, and more particularly to a control circuit having a novel voltage regulator system associated with an amplifier to prevent a switching device from dropping-out on rapidly varying A.C. line changes.

While the control circuit of the invention will be described specifically with reference to temperature controllers, it has many applications such as in pressure, liquid-level, humidity, speed, light and various other types of control and detection systems.

More particularly, in electronic temperature controllers if a sudden drop in A.C. line voltage occurs as the temperature approaches the controller set-point, it may cause the output relay to drop-out momentarily or cycle on-and-off. This results in unnecessary relay wear, poor sensitivity, and consequently high failure rate.

Some manufacturers have overcome the problem with costly, space-consuming, highly regulated power supplies. Others have ignored the problem for economic reasons and thereby provide poor sensitivity and inadequate control.

It is therefore a primary object of the invention to provide a highly sensitive amplifier-switching circuit with simple, compact, automatic line-voltage compensation.

Another object of the invention is to provide an automatic line-voltage-compensated amplifier circuit which can hold-in a narrow differential relay under a wide range of dynamic line-voltage changes for better sensitivity.

Other objects and advantages of the invention will become apparent from the following description and the accompanying drawings.

Figure 1:
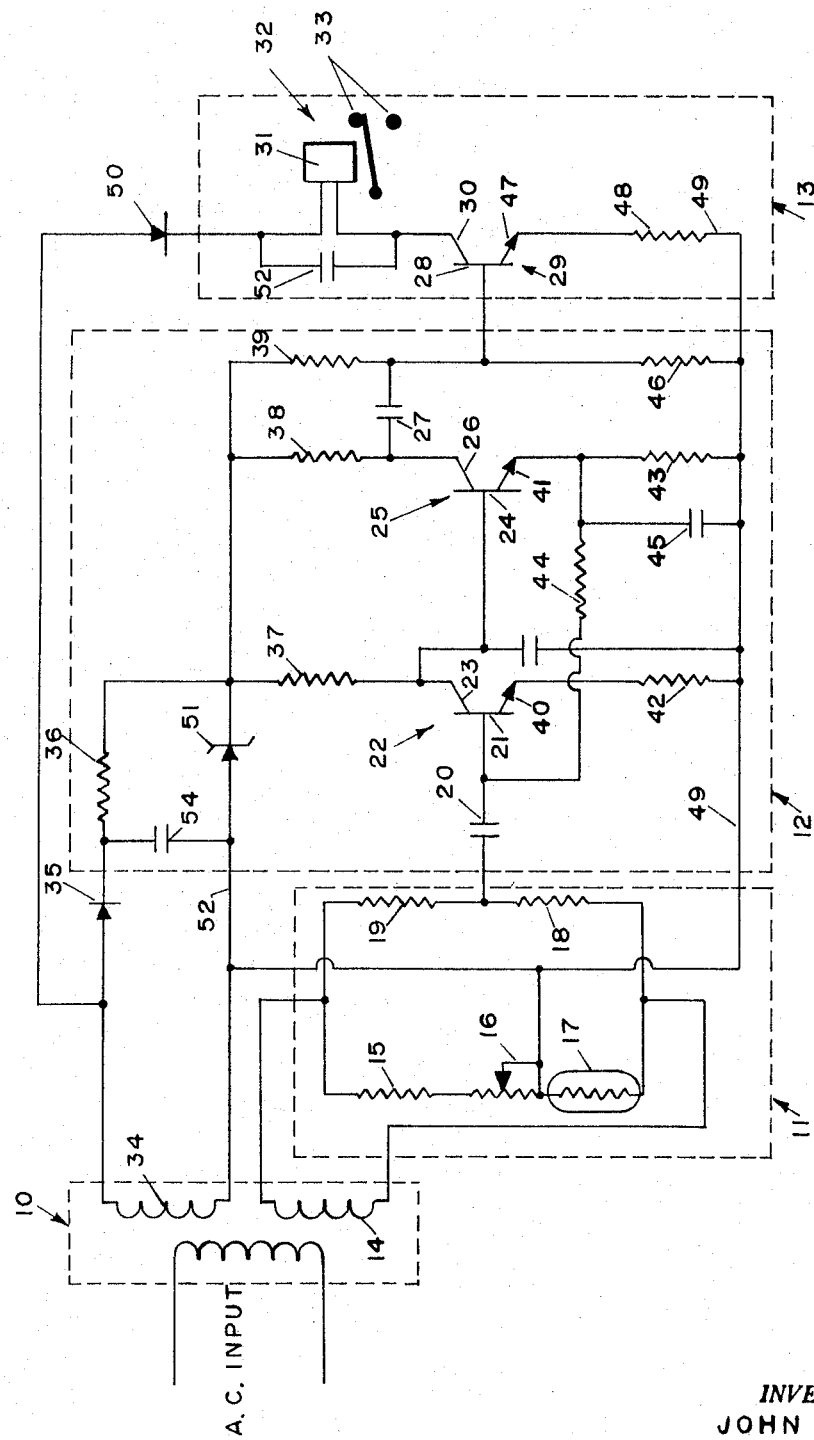
FIG. 1 is a schematic diagram of the circuit of the invention.

With reference now to the drawings, in FIG. 1 the circuit broadly indicated in dotted lines includes a power transformer 10, an A.C. excited bridge 11, an amplifier 12, and an output demodulator and switching circuit 13.

Specifically the bridge circuit 11 receives power from a secondary winding 14 of the transformer 10. One leg of the bridge includes a fixed resistor 15 and a slide wire resistor 16 which may be the graduated potentiometer type. A second leg of the bridge includes a resistance element 17 of the temperature sensing type which changes in resistance with changes in temperature. The third and fourth legs of the bridge are comprised of resistors 18 and 19 respectively.

The signal output of the bridge circuit is coupled through capacitor 20 to the amplifier 12 which for purposes of discussion is shown to be in two stages, although any even number of stages are operable. Specifically, the capacitor 20 is connected to the base 21 of a first transistor 22, the latter having its collector 23 coupled directly to the base 24 of a second transistor 25.

The collector 26 of transistor 25 is coupled by a capacitor 27 to the base 28 of a demodulator transistor 29.

For purposes of controlling the temperature of a given environment in response to a signal from the bridge circuit when it is unbalanced, the collector 30 of the demodulator transistor 29 is connected to the coil 31 of a relay 32. Coil 31 when energized may close relay contacts 33 to actuate the appropriate heating (or cooling) elements.

Excitation of the amplifier transistors 22 and 25, and demodulator transistor 24 is supplied by the secondary transformer winding 34 through rectifier 35 and current limiting resistor 36.

Load resistors 37 and 38 and bias resistor 39 are connected between the limiting resistor 36 and the respective transistor collectors 23 and 26 and demodulator base 28 respectively.

Transistors 22 and 25 have their respective emitters 40 and 41 connected to emitter bias resistors 42 and 43. In addition, a base bias feed-back resistor 44 is connected between the emitter 41 and base 21 of transistor 22. A by-pass capacitor 45 is paralleled with emitter bias resistor 43 to prevent degeneration caused by the latter resistor at signal frequency.

With respect to demodulator transistor 29, excitation bias is afforded by resistors 39 and 46 connected to base 28. The demodulator emitter 47 is connected to a bias resistor 48 and thence to the common conductor 49 which returns to the supply voltage source furnished by transformer winding 34.

For the relay circuit, power is supplied from the transformer winding 34, through a rectifier 50 and thence through the relay coil 31 which has a by-pass capacitor 52 to smooth-out A.C. pulsations.

In operation, when the bridge 11 is unbalanced and the signal therefrom is in-phase with the signal supplied through rectifier 50 to the relay coil 31, an average current will flow through the relay, and if sufficient, will actuate the relay. This will operate an external device such as a heating element, etc. Heat from the heating element will then cause the resistance of the sensor 17 to increase and thus balance the bridge thereby shutting off the in-phase signal.

If the signal from the bridge is out of phase with the reference signal through rectifier 50, no current will flow through relay coil 31 and it will be de-energized.

Now, assuming with full line voltage and a strong bridge signal in-phase with the signal through rectifier 50, that the relay will be energized and that the heating elements will be operating. As the temperature increases, the resistance of sensor 17 will gradually increase to balance the setting of slide wire 16. In such case, the signal from the bridge gradually decreases but it is desirable that the relay coil 31 hold-in since the environment being heated has not reached the set-point temperature.

At this time should the A.C. line-voltage input into transformer 10 suddenly drop, the current to relay coil 31 through rectifier 50 decreases as does the signal from the bridge 10 resulting in the relay dropping out. This can cause unnecessary wear on the relay contacts and poor control sensitivity. Moreover, the situation is aggravated considerably where a considerable line voltage fluctuation occurs as is so often the case in industrial operations with various motors and processes starting and stopping.

As an example of how fluctuation in unregulated line voltage affects relay current, the following formula is given where I (Relay) represents current in the relay coil 31, E (Actual) represents actual line voltage into transformer 10, and E (Std.) represents the rated operating voltage, and K is a constant for the particular relay.

$$I \text{ (Relay)} = K \left[ \frac{E \text{ (Actual)}}{E \text{ (Std.)}} \right]^2$$

For example, where the input line voltage drops from 120 volts to 90 volts, or to 75% of its original value and K is 1, I (Relay) will drop to 56% of its original value.

In the past, manufacturers have attempted to overcome voltage stabilization problems and the accentuated drop in relay current with expensive, space-consuming and highly regulated power supplies. Or, where costs would not permit many have ignored the problem completely resulting in poor sensitivity and control. Others have attempted to put additional contacts on the relays for feedback to the amplifier and boost the signal therefrom which inherently reduces relay control sensitivity.

According to the present invention, to compensate for low voltage effects, means are provided in the amplifier circuit to increase the output signal thereof upon line-voltage drops to thereby maintain the power into the relay coil 31 at a sufficient level to keep it from dropping out. One way which has been used very successfully utilizes means, which for A.C. line voltages slightly under or over the rated voltage, supplies a substantially pure D.C. supply voltage to the amplifier. However, on larger drops below rated A.C. line voltage, it passes an A.C. ripple component which adds to the signal through the amplifier and is further amplified to provide the increased output signal.

A suitable manner of accomplishing this in the present invention involves the use of a zener regulator 51 in the common power supply line 52 connecting to the transformer winding 34.

Figure 2:
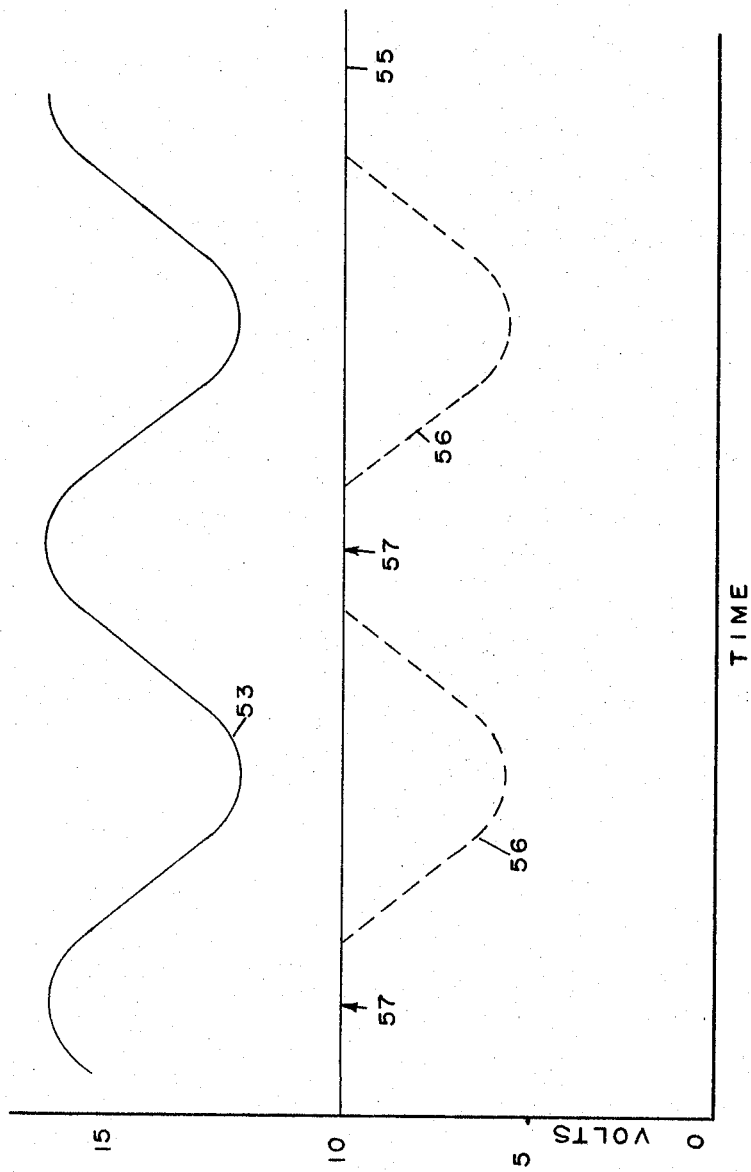
FIG. 2 illustrates typical output voltage curves for a voltage regulator means of the invention as used with the amplifier circuit.

The voltage of the zener regulator 51 is selected to regulate and supply substantially pure D.C. at the rated A.C. line voltage. As shown in FIG. 2, it filters out or cuts off the A.C. ripple component 53 passing by-pass capacitor 54 (FIG. 1) in the amplifier power supply. Thus if transformer winding 34 supplies 18 volts across capacitor 54 when the input to the transformer 10 is 120 volts A.C., the voltage across zener 51 may be only 10 volts D.C. as shown by horizontal line 55 (FIG. 2).

Consequently, when the zener is operating at full voltage it furnishes only a substantially pure D.C. supply voltage and chops off any A.C. ripple. On the other hand, when the A.C. line voltage drops below a specified level, the zener regulation drops and supplies a portion of the A.C. ripple as shown in dotted lines at 56 and with the very top portion chopped-off. That is, the voltage may go to 10 volts in the areas indicated at 57 but drop to 5 volts at the bottom of the dotted lines 56.

It is this ripple component which is impressed on the collector 23 of transistor 22 and is added to the output signal therefrom. The combined ripple signal and bridge signal are then amplified together in transistor 25 and result in an increased output in collector 27. In other words it increases the amplifier output signal. The increased signal from transistor 25 is then fed to demodulator 29 which increases the current through relay coil 31 thereby keeping it energized even though the line voltage has dropped.

As the voltage drops lower, a greater portion of the A.C. ripple 56 is impressed on the amplifier to further increase the relay current. Of course, to enable the ripple voltage to add to the collector voltage of transistor 22, it has to have an in-phase component.

Figure 3:
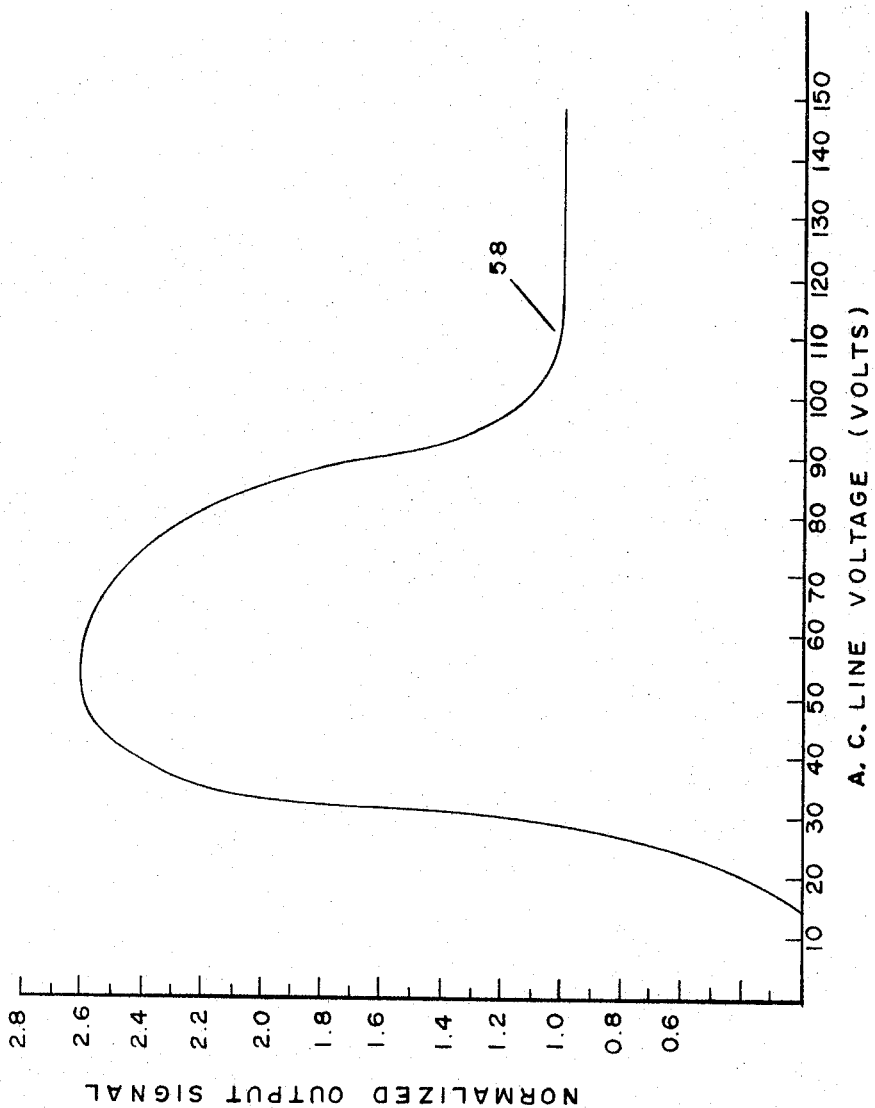
FIG. 3 is a graph of a typical gain vs. voltage curve produced by the circuit of the invention.

To illustrate further, FIG. 3 shows how the output of the circuit of the invention increases as the A.C. line voltage decreases. An output of 1.0 is considered normal for purposes of discussion with an A.C. line voltage of 120 volts being the input to transformer 10. For slight dips to about 110 volts (point 58 on FIG. 3) and for those above 120 volts, the zener is at full regulation and the gain is at the nominal 1.0 value.

As the A.C. line voltage drops below 110 volts, the zener 51 does not regulate fully, or in other words, filter out all of the A.C. ripple. This ripple is then added to the collector 23 and is further amplified by transistor 25 to increase the output as shown in FIG. 3. After the line voltage drops below about 35 volts, the output drops quite rapidly but it is relatively unimportant at this point since the line voltage is so far off regulation that all other components will also have dropped out. However, it is to be pointed out that the curves of FIG. 2 and FIG. 3 can be modified by the proper selection of the zener 51, by-pass capacitor 54 and current limiting resistor 36.

Also, while the invention has been disclosed using a resistance type bridge, it could be operable with a capacitance bridge, an A.C. signal generator, etc., or other combinations. Likewise, it could be utilized in a D.C. system where for example a photo-chopper is used for the A.C. ripple component, etc. Additionally, an electronic switch could be substituted for the relay, etc.

Of course, it is to be understood that the form of the invention disclosed herein is to be taken as the preferred embodiment thereof, and that various changes and modifications may be made without departing from the spirit of the invention or the scope of the following claims.

What I claim is:

1. A control circuit including,
    (a) an A.C. supply source,
    (b) a bridge connected to said A.C. supply source,
    (c) a variable sensing element in one leg of said bridge capable of balancing or causing a change in the phase of the signal output from said bridge,
    (d) an amplifier connected to the output of said bridge, said amplifier being of an even number of stages,
    (e) a demodulator connected to the output of said amplifier,
    (f) a relay connected to the output of said demodulator,
    (g) a rectified power source for said relay and demodulator,
    (h) an A.C. supply voltage source for said amplifier,
    (i) means connected to said A.C. amplifier supply voltage source to regulate the output of said amplifier when said A.C. supply voltage drops below a predetermined value including rectifier means for said relay and output of said demodulator,
    (j) said means for regulating the output of said amplifier serving to increase the output and amplification of the signal received from said bridge when said bridge signal is in-phase with the rectified power to said relay to keep said relay from dropping out when the voltage thereinto drops below a predetermined level.

2. A control circuit as claimed in claim 1 wherein said means connected to said amplifier supply voltage source for regulating the output of said amplifier includes a limiting resistor in series with a zener diode and a by-pass capacitor preceding said resistor and said zener, said means serving to supply substantially pure D.C. voltage to said amplifier when said A.C. supply is at rated value and for supplying a varying ripple voltage component when said A.C. voltage supply drops to a predetermined level.

3. A control circuit as claimed in the claim 2 wherein said A.C. ripple component is added to the output of the first stage of amplification, and the first stage of amplification is coupled to a second stage of amplification.

4. A control circuit including,
    (a) a power source,
    (b) an amplifier,
    (c) means for supplying a signal to said amplifier,
    (d) a switching device connected to said amplifier,
    (e) and means connected to the amplifier to increase the output thereof with decreases in line voltage to maintain the power in the switching device at a sufficient level to prevent it from dropping out.

5. A line voltage compensation circuit including,
    (a) a power source,
    (b) a bridge circuit connected to said power source,
    (c) an amplifier connected to the output of said bridge,
    (d) a switching device connected to said amplifier,
    (e) power supply source for said amplifier,
    (f) and means in said supply source for furnishing substantially pure D.C. to said amplifier at rated line voltage and for supplying a varying ripple voltage component at lower line voltages to increase the output of said amplifier and keep said switching device actuated under low voltage conditions.

6. A line voltage compensation circuit including,
(a) an A.C. power source having several secondary windings,
(b) a bridge circuit connected to one of said windings,
(c) a sensing element transducer in one leg of said bridge,
(d) an amplifier connected to the output of said bridge,
(e) a demodulator connected to the output of said amplifier,
(f) a relay coil connected to said demodulator,
(g) an amplifier power supply connected to another of said secondary windings,
(h) said amplifier power supply having a voltage regulating device therein which provides substantially pure D.C. to said amplifier when the A.C. input line voltage is at rated voltage and passes an A.C. ripple voltage when said line voltage drops to a predetermined point below rated line voltage.

7. In a control circuit having an amplifier actuated switching circuit, the improvement wherein means are provided for furnishing a substantially pure D.C. supply voltage to the amplifier when the line voltage is at its rated value and said means supplies a ripple voltage component when said line voltage drops below a predetermined value, said ripple component being combined with the signal in said amplifier and further amplified to increase the output of said amplifier to compensate for drops in line voltage.

8. In a control circuit having an amplifier actuated switching device, the improvement wherein means are provided for furnishing a substantially pure D.C. supply voltage to the amplifier when the voltage input is at rated value and said means supplies a ripple voltage component when said input voltage is below a predetermined value, said ripple component being combined with the signal in said amplifier and further amplified to increase the output of said amplifier to compensate for drops in line voltage, said means for furnishing a substantially pure D.C. supply voltage including current limiting means in series with a zener, and a by-pass capacitor preceding said zener and current limiting means.

References Cited by the Examiner

UNITED STATES PATENTS 3,209,211    9/1965    Du Vivier _____ 317—142

MILTON O. HIRSHFIELD, *Primary Examiner.*

L. T. HIX, *Assistant Examiner.*